United States Patent
Azegami et al.

(10) Patent No.: US 9,925,602 B2
(45) Date of Patent: Mar. 27, 2018

(54) REPLACEABLE CUTTING HEAD

(71) Applicant: Mitsubishi Materials Corporation, Tokyo (JP)

(72) Inventors: Takayuki Azegami, Akashi (JP); Tarou Abe, Akashi (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 134 days.

(21) Appl. No.: 14/064,767

(22) Filed: Oct. 28, 2013

(65) Prior Publication Data

US 2014/0294528 A1 Oct. 2, 2014

(30) Foreign Application Priority Data

Mar. 29, 2013 (JP) .................................. 2013-074315

(51) Int. Cl.
*B23C 5/10* (2006.01)

(52) U.S. Cl.
CPC ............ *B23C 5/10* (2013.01); *B23C 2210/02* (2013.01); *B23C 2210/03* (2013.01); *B23C 2210/0414* (2013.01); *B23C 2210/0492* (2013.01); *B23C 2210/282* (2013.01); *B23C 2210/40* (2013.01); *B23C 2210/402* (2013.01);
(Continued)

(58) Field of Classification Search
CPC ............ B23C 2210/02; B23C 2210/03; B23C 2210/0414; B23C 2210/0492; B23C 2210/282; B23C 5/10; Y10T 407/1946
See application file for complete search history.

(56) References Cited

U.S. PATENT DOCUMENTS

| 4,662,803 | A | * | 5/1987 | Arnold | ........................... 408/224 |
| 6,250,857 | B1 | * | 6/2001 | Kersten | ................... B23B 51/02 |
| | | | | | 175/394 |
| 7,341,409 | B2 | * | 3/2008 | Jonsson et al. | ................ 408/233 |

(Continued)

FOREIGN PATENT DOCUMENTS

| CN | 201006555 Y | * | 1/2008 | ............ B23B 27/16 |
| DE | 102010055429 A1 | * | 7/2011 | ........... B23B 31/113 |

(Continued)

OTHER PUBLICATIONS http://www.dictionary.com/browse/alternate.*
(Continued)

*Primary Examiner* — Eric A Gates
(74) *Attorney, Agent, or Firm* — Leason Ellis LLP

(57) ABSTRACT

A replaceable cutting head stably rotates a head body using a work tool during attachment. An outer periphery of the head body is provided with a plurality of chip discharge grooves extending along a direction of an axis, cutting blades extending along the chip discharge grooves, and a pair of latching faces that are formed by cutting the outer periphery of the head body and are arranged back to back with the axis interposed therebetween at a base end portion along the axial direction. A first chip discharge groove, and a second chip discharge groove having a narrower width along a circumferential direction around the axis than the first chip discharge groove at at least the base end portion along the direction of the axis are included in the chip discharge grooves. At least one latching face is connected to a base end portion of the second chip discharge groove.

13 Claims, 9 Drawing Sheets

(52) U.S. Cl.
CPC ...... *Y10T 407/1946* (2015.01); *Y10T 408/892* (2015.01); *Y10T 408/95* (2015.01)

(56) References Cited

U.S. PATENT DOCUMENTS

| | | | |
|---|---|---|---|
| 8,529,164 B2* | 9/2013 | Degany | 407/53 |
| 9,550,238 B2* | 1/2017 | Ota | B23C 5/10 |
| 9,643,262 B2* | 5/2017 | Frota de Souza | B23C 5/10 |
| 9,643,264 B2* | 5/2017 | Frota De Souza | B23C 5/10 |
| 2009/0142150 A1* | 6/2009 | Chu | 408/59 |
| 2010/0247263 A1* | 9/2010 | Azegami et al. | 409/234 |
| 2012/0093602 A1 | 4/2012 | Osawa et al. | |
| 2012/0219375 A1* | 8/2012 | Hobohm et al. | 409/234 |
| 2013/0051940 A1* | 2/2013 | Hobohm et al. | 407/53 |
| 2013/0272806 A1* | 10/2013 | Guay | 407/11 |
| 2015/0314379 A1* | 11/2015 | Sharivker | B23C 5/10 407/34 |
| 2017/0291230 A1* | 10/2017 | Harpaz | B23C 5/10 |

FOREIGN PATENT DOCUMENTS

| | | | | |
|---|---|---|---|---|
| DE | 102011012140 A1 * | 8/2012 | | B23C 5/10 |
| DE | 102015010399 A1 * | 3/2017 | | B23B 31/1122 |
| EP | 1847345 A2 * | 10/2007 | | B23B 31/11 |
| JP | 2010-500183 A | 1/2010 | | |
| JP | 2010-284752 A | 12/2010 | | |
| JP | 2011056594 A * | 3/2011 | | B23B 5/10 |
| JP | 2013198973 A * | 10/2013 | | B23B 5/10 |
| WO | WO 9813161 A1 * | 4/1998 | | B23B 29/03 |
| WO | WO-2008/018062 A | 2/2008 | | |
| WO | WO 2009140109 A2 * | 11/2009 | | B23B 5/10 |

OTHER PUBLICATIONS http://dictionary.cambridge.org/us/dictionary/english/alternate.*
https://www.vocabulary.com/dictionary/substantially.*
http://dictionary.cambridge.org/dictionary/english/substantially.*
http://www.macmillandictionary.com/us/dictionary/american/substantially.*
https://en.oxforddictionaries.com/definition/substantially.*
Certificate to be Eligible for the Rule of the Exception of the Loss of Novelty of the Invention filed in the Japan Patent Office indicating that: Mitsubishi Materials Corporation publicly disclosed a product catalogue of Mitsubishi Materials Corporation, "Tools News, B200J, End mill with replaceable head, iMX End Mill series," Cover, p. 1, 3, 5-7 and 11, on Oct. 31, 2012.
Certificate to be Eligible for the Rule of the Exception of the Loss of Novelty of the Invention filed in the Japan Patent Office indicating that: Mitsubishi Materials Corporation publicly disclosed replaceable cutting head(s) invented by Takayuki Azegami and Tarou Abe at the 26th Japan International Machine Tool Fair 2012 (JIMTOF 2012). The product was disclosed on Nov. 1, 2012 at 3-11-1 Ariake, Koto-ku, Tokyo, Japan.
Certificate to be Eligible for the Rule of the Exception of the Loss of Novelty of the Invention filed in the Japan Patent Office indicating that: Mitsubishi Materials Corporation sold replaceable cutting head(s) invented by Takayuki Azegami and Tarou Abe to Mitsubishi Materials Tools Corporation, on Nov. 9, 2012, at Kokusai Fashion Center Building 7F, 16-1 Yokozuna, Sumida-ku, Tokyo, Japan.
Certificate to be Eligible for the Rule of the Exception of the Loss of Novelty of the Invention filed in the Japan Patent Office indicating that: Mitsubishi Materials Corporation publicly disclosed on Nov. 15, 2012 replaceable cutting head(s) invented by Takayuki Azegami and Tarou Abe at the Mitsubishi Materials Corporation websites including: http://www.mitsubishicarbide.com/mmc/jp/index.html; http://www.mitsubishicarbide.com/mmc/jp/whatsnew/2012_2/imx. Html; http://www.mitsubishicarbide. com/mmc/jp/product/pdf/b/b200j. pdf; http://www.mitsubishicarbide. com/mmc/jp/product/new_product/; http://www.mitsubishicarbide. com/mmc/jp/product/catalog/solid_end_mill.html; and http://www.mitsubishicarbide.com/mmc/jp/product/video/milling. html.
Certificate to be Eligible for the Rule of the Exception of the Loss of Novelty of the Invention filed in the Japan Patent Office indicating that: Mitsubishi Materials Corporation sold replaceable cutting head(s) invented by Takayuki Azegami and Tarou Abe to MMC Hardmetal India Pvt. Ltd. Bangalore Head Office, on Dec. 11, 2012, at PRASAD Enclave, Site #118/119, 1st Floor Industrial Suburb 2nd Stage, 5th Main, BBMP Ward #11 Yeshwanth pura Bangalore North Taluk-560 022, India.
Certificate to be Eligible for the Rule of the Exception of the Loss of Novelty of the Invention filed in the Japan Patent Office indicating that: Mitsubishi Materials Corporation sold replaceable cutting head(s) invented by Takayuki Azegami and Tarou Abe to MMC Hardmetal (Thailand) Co., Ltd., on Jan. 10, 2013, at CTI Tower 24th Floor, 191/32 Ratchadapisek Road, Klongtoey, Klongtoey, Bangkok 10110, Thailand.
Certificate to be Eligible for the Rule of the Exception of the Loss of Novelty of the Invention filed in the Japan Patent Office indicating that: Mitsubishi Materials Corporation sold replaceable cutting head(s) invented by Takayuki Azegami and Tarou Abe to Kuk Sung International Co., Ltd., on Jan. 31, 2013, at 5F, Industrial Complex Town, #1629, San-Gyok 2-Dong, Buk-Gu, Taegu, 702-7 10, Korea.
Certificate to be Eligible for the Rule of the Exception of the Loss of Novelty of the Invention filed in the Japan Patent Office indicating that: Mitsubishi Materials Corporation sold replaceable cutting head(s) invented by Takayuki Azegami and Tarou Abe to MMC Hartmetall GmbH, on Feb. 7, 2013, at Comeniusstr. 2, 40670 Meerbusch Germany.
Certificate to be Eligible for the Rule of the Exception of the Loss of Novelty of the Invention filed in the Japan Patent Office indicating that: Mitsubishi Materials Corporation sold replaceable cutting head(s) invented by Takayuki Azegami and Tarou Abe to Mitsubishi Materials (Shanghai) Corporation, on Mar. 12, 2013, at Room 410 8, United Plaza, 1468 Nanjing Road West, Shanghai, 200040 China.
Product catalog published Oct. 31, 2012.
Photographs of the product at the exhibition held on Nov. 1, 2012.
Office Action dated Aug. 29, 2017 for the corresponding Japanese Patent Application No. 2016-203807.

* cited by examiner

REPLACEABLE CUTTING HEAD

This application claims the benefit of Japanese Patent Application. No. 2013-074315, filed Mar. 29, 2013, which is incorporated by reference in its entirety herein.

FIELD OF THE INVENTION

The present invention relates to a replaceable cutting head that is detachably attached to a tip of a tool body and is used for cutting work.

BACKGROUND OF THE INVENTION

In the related art, replaceable cutting heads having a head body detachably attached to a tip of a tool body rotating around an axis by screwing are known. An outer periphery of the head body is provided with a plurality of chip discharge grooves that are arranged at intervals in a circumferential direction around an axis, cutting blades that extend along the chip discharge grooves, and a pair of latching faces that are formed by cutting the outer periphery of the head body in a planar shape and are arranged back to back with the axis interposed therebetween at a base end portion along the direction of the axis.

A work tool, such as a wrench, is made latchable (lockable) to the pair of latching faces, and a replaceable cutting head is rotated around the axis with respect to the tool body by this work tool and thereby, this replaceable cutting head is detached and attached.

For example, the following Patent Document 1 describes a replaceable working head rotating tool in which a fastening male thread and a fastening female thread respectively provided on axial centers on one and the other of a working head (replaceable cutting head) and a holder (tool body) are screwed to each other, and thereby, the working head is concentrically and detachably attached to a tip portion of the holder.

In this replaceable working head rotating tool, the working head and the holder are provided with abutting faces that are made to abut against each other in a fastened state where the fastening male thread and the fastening female thread are screwed to each other, and the fastening male thread and the fastening female thread are integrally rotationally driven via the holder in a tool rotational direction where the fastening male and female threads are fastened due to working load, and thereby, predetermined working is performed by the working head, and the abutment of the abutting faces prevents the fastening male thread and the fastening female thread from being further fastened with working load.

Additionally, Patent Document 1 describes that a pair of double-chamfered flat locking faces (latching faces_) are provided parallel to each other at symmetrical positions to an axial center at the head body of the replaceable cutting head, as tool locking portions (latching portions) to which a work tool for making the fastening male thread and the fastening female thread screwed to each other is locked.

RELATED ART DOCUMENT

Patent Document

[Patent Document 1] JP-A-2010-284752

Problems that the Invention is to Solve

However, the replaceable cutting heads in the related art have the following problems.

As this type of replaceable cutting head, a replaceable cutting head in which a plurality of chip discharge grooves provided at an outer periphery of a head body are arranged at unequal intervals so as to have mutually different widths in a circumferential direction is known. Particularly in a chip discharge groove having a narrow width among the plurality of chip discharge grooves adapted to have unequal intervals (unequal division), there is a room for an improvement in preventing chip clogging.

Additionally, the rigidity of a circumferential portion of the head body, where a chip discharge groove having a broad width in the circumferential direction among the plurality of chip discharge grooves arranged at unequal intervals is located, is apt to become lower compared to the rigidity of portions other than the circumferential portion.

Additionally, the rigidity of the head body is apt to be reduced in a predetermined direction even in the pair of latching faces. Specifically, since these latching faces are formed by cutting the outer periphery of the head body in a planar shape, the rigidity of the circumferential portion of the head body where the latching faces are located is apt to be reduced.

Because of such a situation, working accuracy may be influenced such that the balance of the strength of the head body collapses or chattering vibration may occur during cutting work.

Additionally, the above Patent Document 1 describes that the replaceable cutting head has cutting blades according to the types of tools and is made of predetermined tool materials, such as cemented carbide and high-speed tool steel, and compound films, such as TiN, TiCN, TiAlN, CrN, and hard films (coating films), such as a DLC film or a diamond film, coated on the head body if necessary. Since the replaceable cutting head adapted to have such a configuration has a large number of types and also has a complicated structure compared to a tool body in which parts can be made common, it is preferable to make a length along the direction of the axis as small as possible.

However, when the replaceable cutting head is simply made small, the base end portions (cut-end portion) of the chip discharge grooves become apt to interfere with the latching portions. This interference influences the work of rotating the head body with the work tool when both end edges (edges) of the latching portions along the circumferential direction are cut out by the chip discharge grooves.

SUMMARY OF THE INVENTION

The invention has been made in view of such a situation, and an object thereof is to provide a replaceable cutting head that can suppress chattering vibration or the like during cutting work, can improve chip discharge performance even in a chip discharge groove having a narrow width, and thereby, sufficiently enhance cutting accuracy and cutting stability, and can stably rotate a head body using a work tool during attachment and detachment with respect to the tool body while making the head body small to suppress manufacturing cost.

Means for Solving the Problems

In order to solve such problems and achieve the above object, the invention suggests the following means.

That is, the invention provides a replaceable cutting head having a head body detachably attached to a tip of a tool body rotating around an axis by screwing. An outer periphery of the head body is provided with a plurality of chip discharge grooves that extend along a direction of the axis; cutting blades that extend along the chip discharge grooves; and a pair of latching faces that are formed by cutting the outer periphery of the head body in a planar shape and are arranged back to back with the axis interposed therebetween at a base end portion along the direction of the axis. A first chip discharge groove, and a second chip discharge groove having a narrower width along a circumferential direction around the axis than the first chip discharge groove at the base end portion along the direction of the axis are included in the plurality of chip discharge grooves. At least one latching face out of the pair of latching faces is connected to a base end portion of the second chip discharge groove.

According to the replaceable cutting head of the invention, the pair of latching faces to which a work tool, such as a wrench, is latched (locked) are arranged back to back at the base end portion of the outer periphery of the head body, and at least one latching face out of the latching faces is connected to the base end portion (cut-end portion) of the second chip discharge groove, which is made narrower than the first chip discharge groove, out of the plurality of chip discharge grooves. Thus, the following effects are exhibited.

In addition, the expression "the latching face is connected to the base end portion of the chip discharge groove" as described in the present specification represents a state where the base end portion (cut-end portion) of the chip discharge groove opens adjacent to the in-plane of the latching face.

First, as a first effect, the balance of the rigidity of the head body is easily secured equally in the circumferential direction.

Specifically, a circumferential portion of the head body, which is formed with the first chip discharge groove having a broad width in the circumferential direction, out of the base end portions of the first and second chip discharge grooves having mutually different widths in the circumferential direction, is apt to have lower rigidity compared to regions other than this circumferential portion. Additionally, the circumferential portion of the head body, where the latching face formed by cutting the outer periphery of the head body in a planar shape is located, is apt to have lower rigidity compared to the circumferential portion of the head body that is not formed with the latching face.

Thus, in the invention, the latching face is connected to the base end portion of the second chip discharge groove having a narrow width, so that a portion whose rigidity in the circumferential direction is markedly reduced being generated in the head body can be reliably suppressed.

In detail, in the base end portion of the head body, the rigidity of the head body is reduced along a direction in which the pair of latching faces are arranged back to back. On the other hand, in the portion located further toward the tip side than the base end portion of the head body, the rigidity is reduced along directions (for example, the direction in which first chip discharge grooves are arranged back to back) other than the direction in which the latching faces are arranged back to back.

In this way, since the portions of the head body where the rigidity becomes low are distributed in the circumferential direction in respective portions in the direction of the axis, it is easy to secure the strength balance of the head body equally in the circumferential direction for the whole tool. This can prevent chattering vibration or the like from occurring during cutting work.

Additionally, as a second effect of the invention, chip discharge performance can be enhanced even in the second chip discharge groove where the width of the base end portion is narrow.

That is, since the latching face formed by cutting the outer periphery of the head body is connected to the base end portion (cut-end portion) of the second chip discharge groove, a space is easily secured between the latching face and a worked surface of a work material to be cut by the replaceable cutting head. That is, the latching face functions like a chip pocket, and thus, it is possible to avoid a situation where chips that flow within the second chip discharge groove are clogged at the cut-end portion of the groove, and chip discharge performance is improved.

Additionally, as a third effect, it is possible to stably perform the work of detaching and attaching the head body with respect to the tool body while keeping the length of the head body along the direction of the axis small to reduce manufacturing cost.

That is, since the latching face to which a work tool is latched is arranged at the base end portion of the outer periphery of the head body and is connected to the base end portion of the chip discharge groove, it is easy to keep the length of the head body small along the direction of the axis, compared to a configuration where the latching face and the chip discharge groove are arranged at an interval in the direction of the axis as in the above Patent Document 1, for example unlike the present invention.

In detail, compared to a tool body for which it is easy to make parts common and is easily manufactured at low cost, the head body of the replaceable cutting head is made of expensive materials, such as cemented carbide, and manufacture of the cutting head is complicated, such as the cutting blades being subjected to coating treatment, and a plurality of types of cutting heads are prepared by including various cutting blades according to types of tools. Therefore, by keeping the length of the head body along the direction of the axis small as in the invention, the manufacturing cost is reduced and parts management becomes easy.

Additionally, since the chip discharge groove connected to the latching face at the outer periphery of the head body is the second chip discharge groove whose base end portion is made narrow, the second chip discharge groove prevents both end edges (edges) of the latching face in the circumferential direction from being cut out. That is, according to the invention, it is easy to largely secure the contact (abutment) length along the circumferential direction between the latching face and a work tool latched to the latching face. Accordingly, the replaceable cutting head is stably and easily rotated by the work tool, and the workability of attachment and detachment of the replaceable cutting head with respect to the tool body is improved.

As described above, according to the replaceable cutting head of the invention, the chattering vibration or the like during cutting work can be suppressed, chip discharge performance can be improved even in the chip discharge groove having a narrow width, and thereby, cutting accuracy and cutting stability can be sufficiently enhanced. In addition, it is possible to stably rotate the head body using a work tool during attachment and detachment with respect to the tool body while making the head body small to suppress the manufacturing cost.

Additionally, in the replaceable cutting head of the invention, both end edges of at least one latching face along the circumferential direction out of the pair of latching faces extend in a ridgeline at the outer periphery of the head body without being cut out in the chip discharge grooves.

In this case, since the contact (abutment) length along the circumferential direction between the latching face and a work tool latched to the latching face can be reliably and largely secured, and the aforementioned effects, that is, the effects that the replaceable cutting head is stably and easily rotated by the work tool and the workability of attachment and detachment of the replaceable cutting head with respect to the tool body is enhanced becomes more remarkable.

Additionally, in the replaceable cutting head of the invention, an even number of the chip discharge grooves may be formed at the outer periphery of the head body, and the pair of latching faces may be respectively connected to the base end portions of the second chip discharge grooves that are arranged back to back with the axis interposed therebetween.

In this case, the aforementioned functions are obtained by both of the pair of latching faces, and the effects become more remarkable.

Advantage of the Invention

According to the replaceable cutting head of the invention, the chattering vibration or the like during cutting work can be suppressed, chip discharge performance can be improved even in the chip discharge groove having a narrow width, and thereby, cutting accuracy and cutting stability can be sufficiently enhanced. In addition, it is possible to stably rotate the head body using a work tool during attachment and detachment with respect to the tool body while making the head body small to suppress the manufacturing cost.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Best Mode for Carrying Out the Invention

A replaceable cutting head 10 related to one embodiment of the invention will be described below with reference to the drawings.

Figure 1:
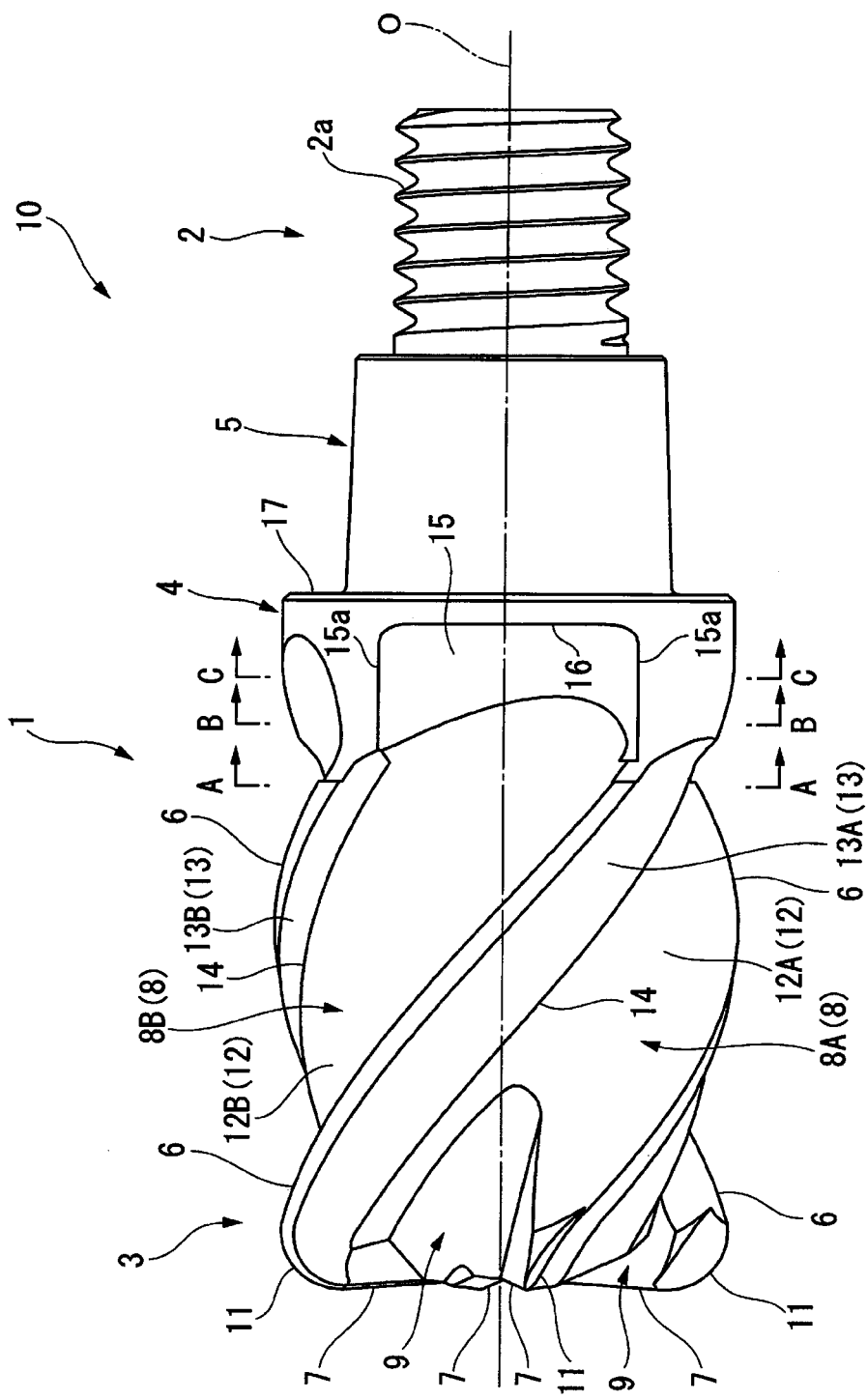
FIG. 1 is a side view showing a replaceable cutting head related to one embodiment of the invention.
Figure 2:
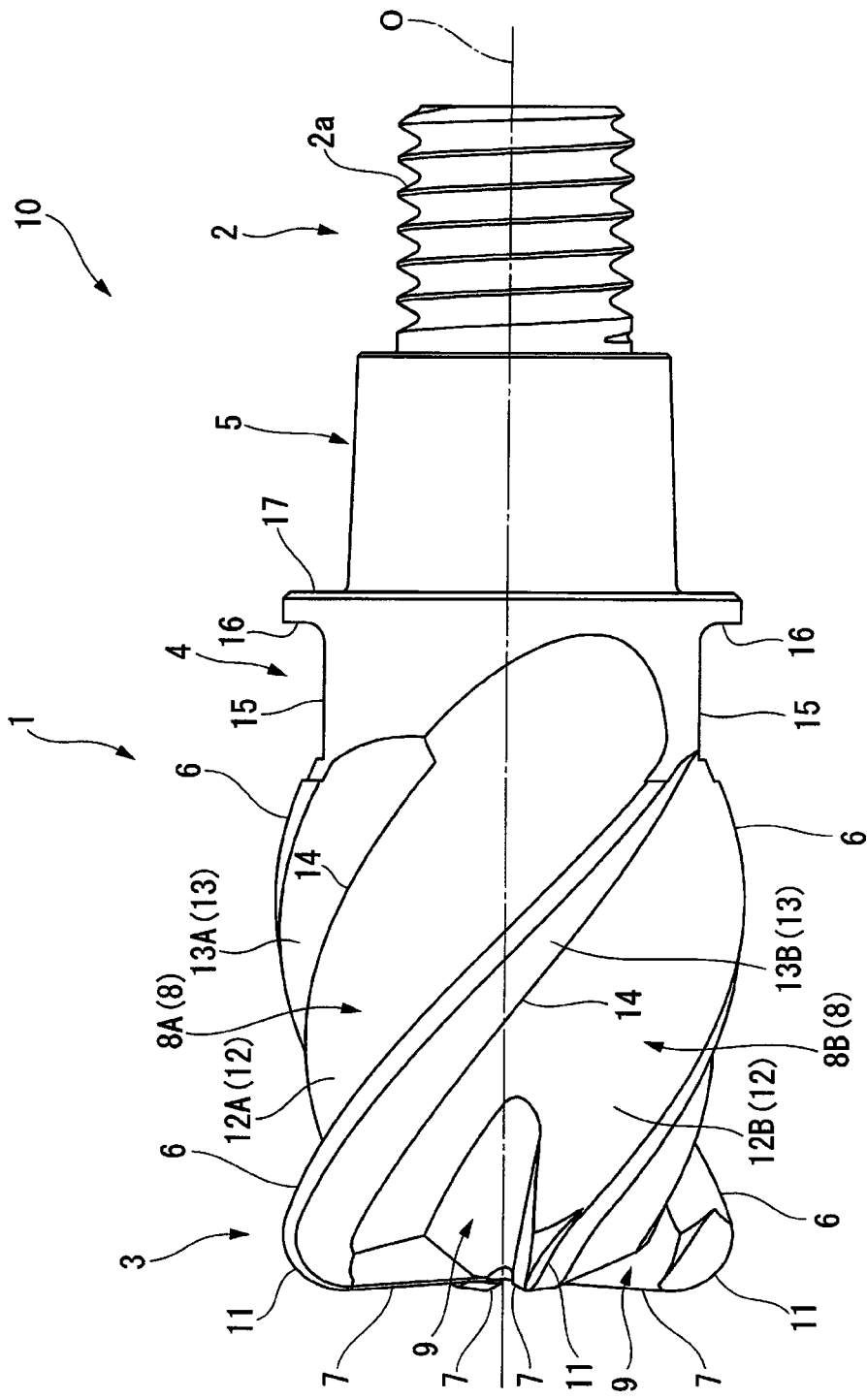
FIG. 2 is a side view showing the replaceable cutting head related to one embodiment of the invention.
Figure 3:
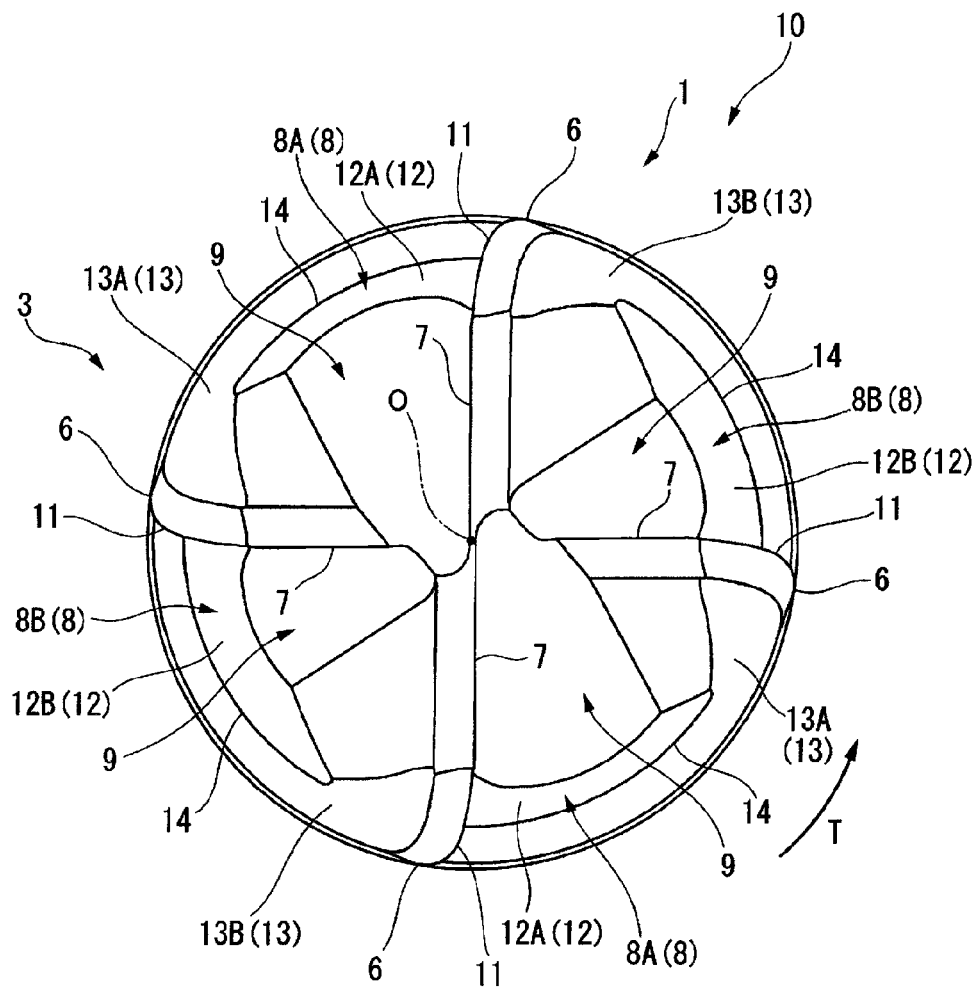
FIG. 3 is a front view showing the replaceable cutting head related to one embodiment of the invention.

The replaceable cutting head 10 of the present embodiment, which is a cutting head that is detachably attached to a tip of a tool body (not shown), such as a holder (shank) that has, for example, a shaft shape and is rotated around an axis O, by screwing, and constitutes a replaceable head turning cutting tool (replaceable head cutting tool), is used for, for example, end milling, drilling, reaming, or the like. As shown in FIGS. 1 to 3, the replaceable cutting head 10 described in the present embodiment is formed in the shape of a radius end mill.

The replaceable cutting head 10 includes a head body 1 integrally formed of hard materials, such as cemented carbide, and a connecting member 2 integrally formed of metallic materials, such as a steel material whose hardness is lower than that of the head body 1. The head body 1 is formed with a cutting blade portion 3, a latching portion 4, and an attaching portion 5 in order from a tip side (left side in FIGS. 1 and 2) toward a base end side (right side in FIGS. 1 and 2), and the connecting member 2 is provided with a threaded portion 2a that protrudes further to the base end side from the attaching portion 5.

Here, the head body 1 has a multistage columnar shape, the connecting member 2 has a columnar shape having a smaller diameter than the head body 1, and the head body and connecting member are disposed coaxially with each other with the axis O as a common axis. In the present specification, a head body 1 side along the direction of the axis O of the replaceable cutting head 10 is referred to as the tip side, and a connecting member 2 side along the direction of the axis O is referred to as a base end side. Additionally, a direction orthogonal to the axis O is referred to as a radial direction, and a direction going around the axis O is referred to as a circumferential direction. In addition, as for the circumferential direction, a direction in which the replaceable cutting head 10 is rotated with respect to a work material during cutting work is referred to as a tool rotational direction T (or forward in the tool rotational direction T), and a direction opposite to the tool rotational direction T is referred to as backward in the tool rotational direction T (refer to FIGS. 3 to 6).

Additionally, an "outer periphery of the head body 1" as described in the present specification means a portion exposed to a tool outer periphery in a state where the head body 1 is mounted on the tool body, and specifically means the outer periphery of the cutting blade portion 3 and the latching portion 4 of the head body 1.

In FIGS. 1 and 2, the cutting blade portion 3 of the head body 1 has a substantial columnar outer shape centered on the axis O, and the outer periphery of the cutting blade portion 3 is formed with a plurality of chip discharge grooves 8 that extend along the direction of the axis O, and peripheral cutting blades (cutting blades) 6 that extend along the chip discharge grooves 8. A plurality of the peripheral cutting blades 6 are formed at unequal intervals in the circumferential direction at the outer periphery of the head body 1, and a plurality of the chip discharge grooves 8 that constitute rake faces of the peripheral cutting blades 6 are also correspondingly formed at unequal intervals in the circumferential direction. Here, the expression "at unequal intervals in the circumferential direction" as described in the present specification includes the state of "at unequal intervals in the circumferential direction at at least any position along the direction of the axis O", and the specific arrangement of the peripheral cutting blades 6 and the chip discharge grooves 8 will be described below.

In the example of the present embodiment, as shown in FIG. 3, the plurality of chip discharge grooves 8 are arranged at regular intervals in the circumferential direction at the tip along the direction of the axis O. On the other hand, since the leads of a main groove 12 and a sub-groove 13 (to be described below) of each chip discharge groove 8 differ, respectively, as shown in FIGS. 1 and 2, the chip discharge grooves are arranged at unequal interval in the circumferential direction from the tip toward the base end side along the direction of the axis O, and are arranged at unequal intervals also at base end portions (cut-end portions) of the chip discharge grooves 8. That is, since the chip discharge grooves 8 have mutually unequal leads, the chip discharge grooves have unequal intervals in the circumferential direction at at least the base end portions thereof along the direction of the axis O. In addition, although not particularly shown, the chip discharge grooves 8 may be arranged at unequal intervals in the circumferential direction while having mutually equal leads.

The plurality of chip discharge grooves 8 are provided at the outer periphery of the head body 1, and an even number of (four in the illustrated example) the chip discharge grooves 8 are formed in the present embodiment. The replaceable cutting head 10 of the present embodiment is used for a replaceable head end mill, and the chip discharge grooves 8 extend so as to be gradually twisted backward in the tool rotational direction T as it goes from the tip of the cutting blade portion 3 to the base end side. Additionally, an outer-peripheral-side side ridge portion of a wall surface of the chip discharge groove 8 directed in the tool rotational direction T is formed with a peripheral cutting blade 6 that has this wall surface as a rake face, and the peripheral cutting blade 6 extends so as to be gradually twisted toward the back in the tool rotational direction T as it goes from the tip of the cutting blade portion 3 to the base end side.

Additionally, a first chip discharge groove 8A, and a second chip discharge groove 8B having a narrower width along the circumferential direction than the first chip discharge groove 8A are included in the plurality of chip discharge grooves 8 at at least the base end portion (cut-end portion) thereof along the direction of the axis O. That is, compared with the groove width of the base end portion in the first chip discharge groove 8A, the groove width of the base end portion in the second chip discharge groove 8B is configured to be narrower. In the present embodiment, the groove width of the second chip discharge groove 8B is made equal to the groove width of the first chip discharge groove 8A only at the tip, while the groove width of the second chip discharge groove 8B is narrower than the groove width of the first chip discharge groove 8A in portions other than this tip. In this way, two first chip discharge grooves 8A and two second chip discharge grooves 8B that have mutually different widths in the circumferential direction are formed at the outer periphery of the cutting blade portion 3 so as to be alternate in the circumferential direction. As a result, the arrangement pitch (arrangement pitch of the peripheral cutting blades 6) of the chip discharge grooves 8 adjacent to each other in the circumferential direction are also adapted such that portions (narrow pitch) that are narrow in the circumferential direction and portions (broad pitch) that are broad in the circumferential direction appear alternately.

Figure 4:
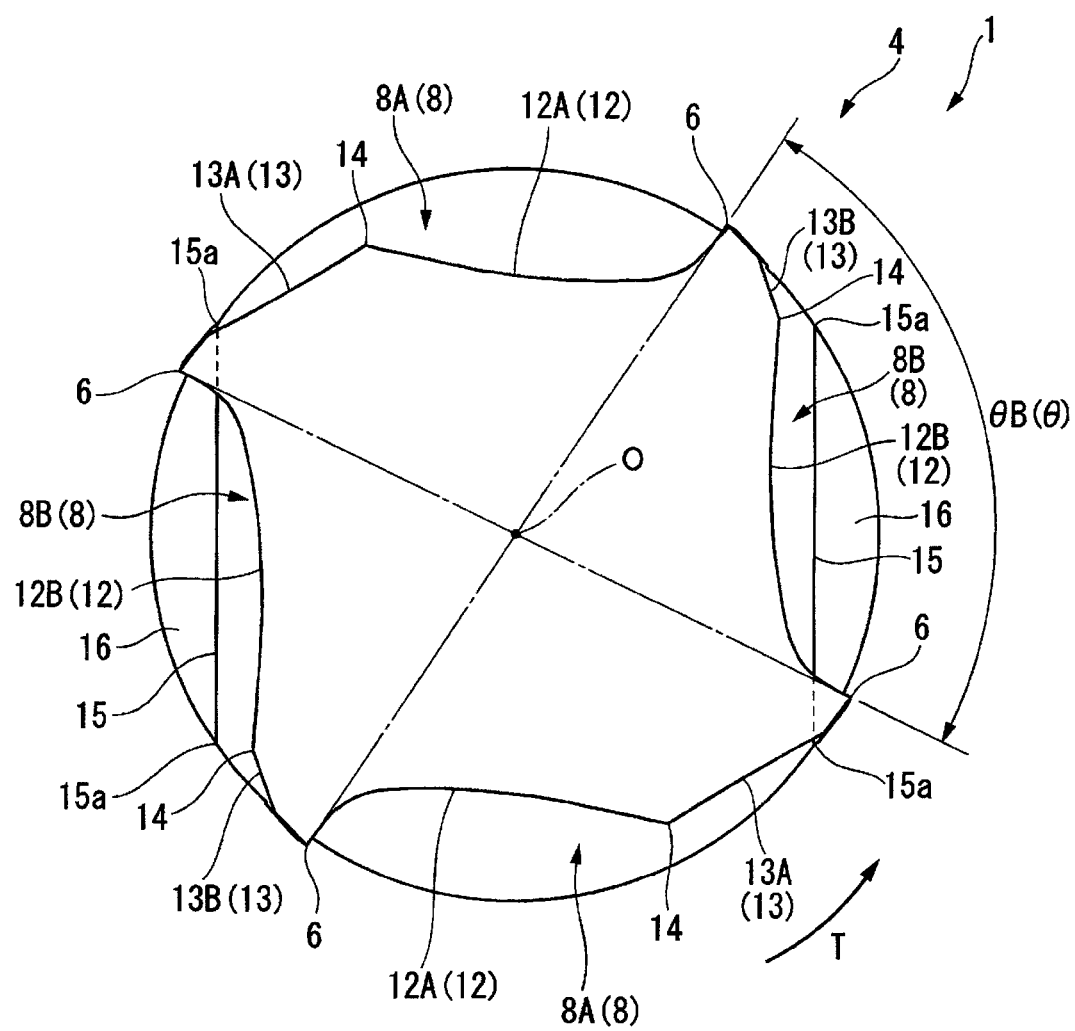
FIG. 4 is a view showing an A-A cross-section of FIG. 1.
Figure 7:
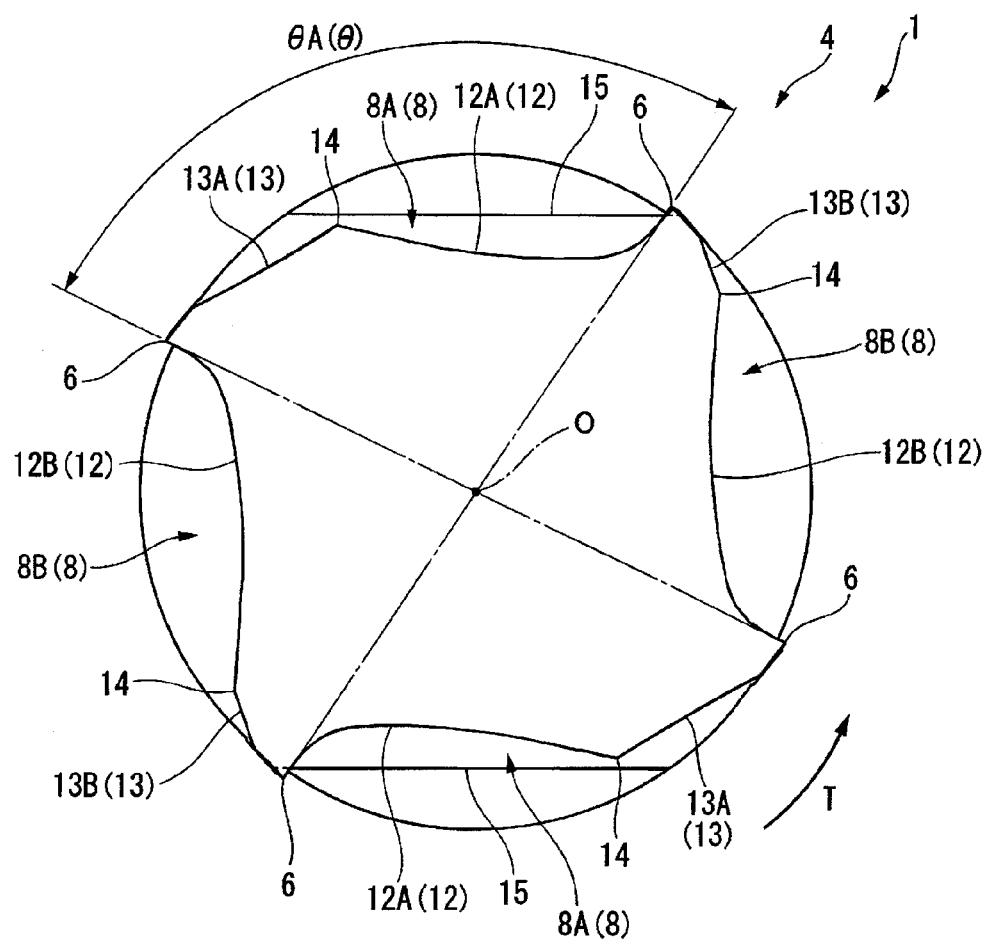
FIG. 7 is a view, corresponding to the cross-section A-A of FIG. 1, illustrating a replaceable cutting head related to a reference example different from the invention in technical thought.

Specifically, as viewed in cross-sectional views shown in FIGS. 4 and 7, a chip discharge groove 8 corresponding to a central angle θA (FIG. 7) that becomes an obtuse angle out of respective central angles θ that are formed between the peripheral cutting blades 6 adjacent to each other in the circumferential direction and are centered on the axis O serves as the broad first chip discharge groove 8A, and a chip discharge groove 8 corresponding to a central angle θB (FIG. 4) that becomes an acute angle serves as the narrow second chip discharge groove 8B.

Additionally, each chip discharge groove 8 has the main groove 12 that forms the peripheral cutting blade 6 and the rake face, and the sub-groove 13 that is adjacent to the front of the main groove 12 in the tool rotational direction T and is formed to have a narrower width in the circumferential direction than the main groove 12. In the example of the present embodiment, the first and second chip discharge grooves 8A and 8B are adapted such that the respective main grooves 12A and 12B have almost the same cross-sectional shape (particularly, the shapes thereof from rake faces to groove bottoms are the same), and the respective sub-grooves 13A and 13B have mutually different groove depths and groove widths. Specifically, the groove depth and groove width in the sub-groove 13A of the first chip discharge groove 8A are made larger than the groove depth and groove width in the sub-groove 13B of the second chip discharge groove 8B, and thereby, the groove width of the whole first chip discharge groove 8A is larger than the groove width of the whole second chip discharge groove 8B.

Additionally, a ridgeline portion 14, which is located between the main groove 12 and the sub-groove 13 to have a convex V-shape toward an outer side in the radial direction in a cross-section and extends so as to be twisted along each chip discharge groove 8, is formed within each chip discharge groove 8.

While such a chip discharge groove 8 is formed at the outer periphery of the cutting blade portion 3 of the head body 1, the base end portion (cut-end portion) thereof extends over an outer periphery of the latching portion 4 of the head body 1.

Additionally, in FIGS. 1 to 3, a tip portion of each chip discharge groove 8 is formed with a concave gash 9. A tip-side side ridge portion of a wall surface of each gash 9 directed in the tool rotational direction T is formed with a bottom blade 7 that has this wall surface as a rake face. The bottom blade 7 extends in a slightly inclined manner so as to recede gradually toward the base end side as it goes to an inner side in the radial direction.

As shown in FIG. 3, a plurality of the bottom blades 7 are formed to have a radial shape centered on the axis O in a tip surface of the cutting blade portion 3. Among these bottom blades 7, a bottom blade 7 connected to the peripheral cutting blade 6 of the first chip discharge groove 8A is formed so as to have a longer cutting length along the radial direction than a bottom blade 7 connected to the peripheral cutting blade 6 of the second chip discharge groove 8B.

Additionally, the bottom blade 7 and the peripheral cutting blade 6 are smoothly connected to each other by a corner blade 11 having a curved shape so as to become convex toward the outer side in the radial direction and the tip side.

In FIGS. 1 and 2, the latching portion 4 has a substantially disc-like outer shape having a diameter approximately equal to or smaller than the external diameter of the peripheral cutting blades 6 of the cutting blade portion 3, and is formed so as to include cut-end portions toward an outer peripheral side of base ends of the chip discharge grooves 8 of the cutting blade portion 3. An outer periphery of the latching portion 4 is located at a base end portion at the outer periphery of the head body 1.

A pair of latching faces 15 made parallel to the axis O and also made parallel to each other are formed with the axis O interposed therebetween at regular intervals from the axis O in the latching portion 4 so as to cut out an outer peripheral surface of the latching portion 4.

As shown in FIGS. 2 and 4, the pair of latching faces 15 are formed by cutting the outer periphery of the latching portion 4 in a planar shape, and are arranged back to back with the axis O interposed therebetween at the base end portion (that is, latching portion 4) along the direction of the axis O at the outer periphery of the head body 1. The latching faces 15 are arranged on a base end side of the chip discharge grooves 8 and the peripheral cutting blades 6 in the outer periphery of the head body 1.

When a latching face 15 is viewed from the front in a side view shown in FIG. 1, the latching face 15 is formed on the outer periphery of the latching portion 4 so as to have a substantially rectangular shape.

At least one latching face 15 of the pair of latching faces 15 is connected to the base end portion of the narrowed second chip discharge groove 8B. In the example of the present embodiment, as shown in FIG. 4, a total of four chip discharge grooves 8 are provided at the outer periphery of the head body 1, two first chip discharge grooves 8A or two second chip discharge grooves 8B are arranged back to back so as to be opposite to each other with the axis O interposed therebetween (180° rotational symmetrical positions), and correspondingly, the pair of latching faces 15 are connected to the base end portions of the pair of second chip discharge grooves 8B, respectively.

In FIG. 1, the base end portion of the second chip discharge groove 8B opens adjacent to the tip side within the plane of the latching face 15. That is, in this side view, one side located at the tip among four sides that form the outer shape of the latching face 15 has a concave curved shape recessed toward the base end side (toward the inside of the plane of the latching face 15) so as to correspond to the cut-up shape of the base end portion of the second chip discharge groove 8B, and the other three sides have a linear shape. As a result, the latching face 15 has a U-shape in the side view of FIG. 1.

Additionally, both end edges 15a along the circumferential direction of the latching face 15 (a pair of sides located at both ends in the circumferential direction) extend in the shape of a ridgeline at the outer periphery of the head body 1 without being cut out in the chip discharge groove 8. In the example of the present embodiment, the end edges 15a extend so as to become parallel to the axis O at the outer periphery of the latching portion 4, and form a linear ridgeline.

Additionally, a wall surface 16, which rises toward the outer side in the radial direction and is directed to the tip side so as to become perpendicular to the axis O, is erected from one side located at the base end of the latching face 15.

In addition, the surfaces of the cutting blade portion 3 and the latching portion 4 of the head body 1 are preferably coated with a coating film.

The attaching portion 5 has a truncated cone shape that has a smaller diameter than the latching portion 4 and has a reduced external diameter as it goes to the base end side and that is centered on the axis O. An annular stepped face 17 directed to the base end side between the latching portion 4 and the attaching portion 5 is a plane perpendicular to the axis O. Additionally, an attachment hole (not shown) centered on the axis O is formed to the middles of the latching portion 4 and the cutting blade portion 3 from a base end face of the attaching portion 5 toward the tip side.

The connecting member 2 includes a shaft portion (not shown) that is inserted into and fixed to the attachment hole, and the threaded portion 2a that serves as a male thread portion having a larger diameter than the shaft portion and having a smaller diameter than the base end face of the attaching portion 5. The fixation of the shaft portion of the connecting member 2 to the attachment hole is performed, for example, by forming through hole along the axis O in the connecting member 2 from the shaft portion to the threaded portion 2a, making the stepped face of the tip of the threaded portion 2 stepped from the shaft portion abut against the base end face of the attaching portion 5, fitting the shaft portion into the attachment hole, and then driving a punch into the through hole from the base end side to plastically deform the shaft portion and increase the diameter of the shaft portion, thereby joining the shaft portion to the attachment hole.

In the replaceable cutting head 10 configured in this way, the head body 1 is detachably attached to a tip portion of a cylindrical tool body by the connecting member 2, and cutting work is performed on a work material by the cutting blade portion 3 of the head body 1. The tip portion of the tool body is formed with an abutting face against which the stepped face 17 of the head body 1 can abut, a taper hole that opens to the abutting face and has a gradually reduced diameter as it goes to the base end side of the tool body, and a female thread portion that is formed at the bottom of the taper hole, and the replaceable cutting head 10 is fixed to the tip portion of the tool body by screwing the threaded portion 2a serving as the male thread portion into the female thread portion to bring the attaching portion 5 into close contact with the taper hole and make the stepped face 17 abut against the abutting face.

When the threaded portion 2a of the connecting member 2 is screwed into the female thread portion of the tool body in this way, or when the threaded portion 2a is loosened when the replaceable cutting head 10 is detached from the tool body, a pair of engaging faces of a U-shaped opening portion of work tools, such as a wrench and a spanner, is engaged with the pair of latching faces 15, whereby the work tool is latched to the latching portion 4 and the head body 1 is rotated around the axis O together with the connecting member 2.

According to the replaceable cutting head 10 of the present embodiment described above, the pair of latching faces 15 to which a work tool is latched (locked) are arranged back to back at the base end portion of the outer periphery of the head body 1, and at least one latching face 15 out of the latching faces 15 is connected to the base end portion (cut-end portion) of the narrowed second chip discharge groove 8B out of the first and second chip discharge grooves 8A and 8B that have unequal intervals (unequal division) and have mutually different widths in the circumferential direction. Thus, the following effects are exhibited.

That is, first, as a first effect, the balance of the rigidity of the head body 1 is easily secured equally in the circumferential direction.

Specifically, a circumferential portion of the head body 1, which is formed with the first chip discharge groove 8A having a broad width in the circumferential direction, out of the base end portions of the first and second chip discharge grooves 8A and 8B having mutually different widths in the circumferential direction, is apt to have lower rigidity compared to regions other than this circumferential portion. Additionally, the circumferential portion of the head body 1, where the latching face 15 formed by cutting the outer periphery of the head body 1 in a planar shape is located, is apt to have lower rigidity compared to the circumferential portion of the head body 1 that is not formed with the latching face 15.

Thus, in the present embodiment, the latching face 15 is connected to the base end portion of the second chip discharge groove 8B having a narrow width, so that a portion whose rigidity in the circumferential direction is markedly reduced being generated in the head body 1 can be reliably suppressed.

Figure 5:
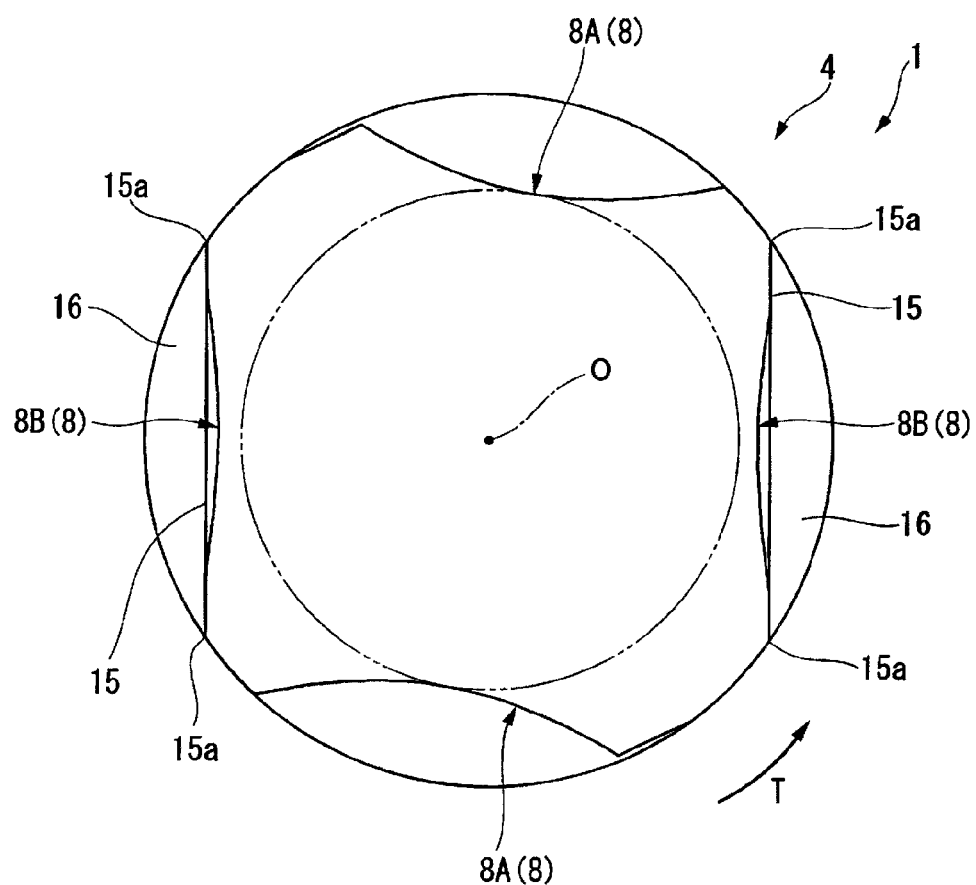
FIG. 5 is a view showing a B-B cross-section of FIG. 1.
Figure 6:
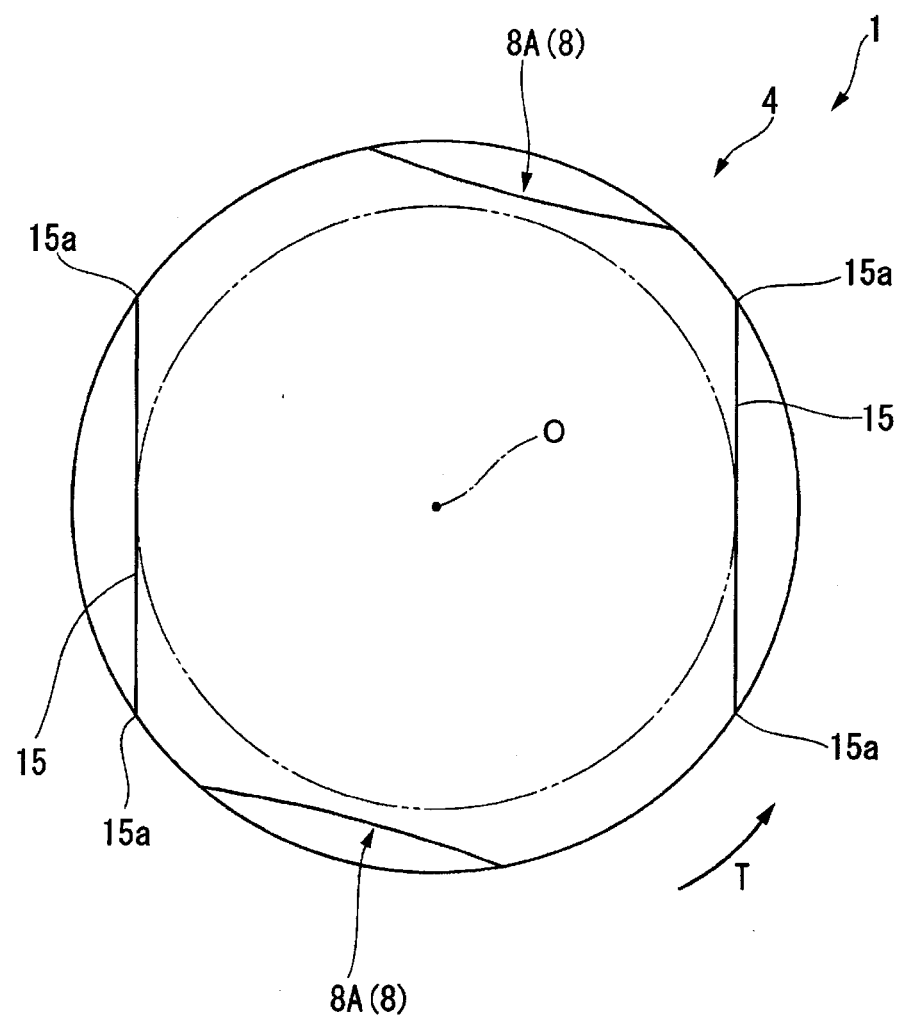
FIG. 6 is a view showing a C-C cross-section of FIG. 1.

In detail, in the base end portion (central portion along the direction of the axis O of the latching portion 4 in the present embodiment) of the head body 1, as shown in FIG. 6 that is a C-C cross-section of FIG. 1, the rigidity of the head body 1 is reduced along a direction (right-and-left direction in FIG. 6) in which the pair of latching faces 15 are arranged back to back. On the other hand, in the portion (in the present embodiment, the portion located further toward the tip side than the central portion of the latching portion 4) located further toward the tip side than the base end portion of the head body 1, as shown in FIG. 5 that is a B-B cross-section of FIG. 1, the rigidity is reduced along directions (specifically, the direction in which the first chip discharge grooves 8A are arranged back to back and up-and-down direction in FIG. 5) other than the direction in which the latching faces 15 are arranged back to back.

Here, virtual circles shown by two-dot chain lines in FIGS. 5 and 6 represent inscribed circles passing through portions having a minimum external diameter, in respective cross-sections of these head bodies 1. The distance between the pair of latching faces 15 (distance between outer peripheries in the right-and-left direction in FIG. 6) is smaller in the base end portion of the head body 1 shown in FIG. 6, compared to the distance between the pair of first chip discharge grooves 8A (distance between outer peripheries in the up-and-down direction in FIG. 6). On the other hand, the distance between the pair of first chip discharge grooves 8A (distance between outer peripheries in the up-and-down direction in FIG. 5) is smaller in the portion located further toward the tip side than the base end portion of the head body 1 shown in FIG. 5, compared to the distance between the pair of second chip discharge grooves 8B (distance between outer peripheries in the right-and-left direction in FIG. 5).

In this way, since the portions of the head body 1 where the rigidity becomes low are distributed in the circumferential direction in respective portions in the direction of the axis O, it is easy to secure the strength balance of the head body 1 equally in the circumferential direction for the whole tool. This can prevent chattering vibration or the like from occurring during cutting work.

Figure 8:
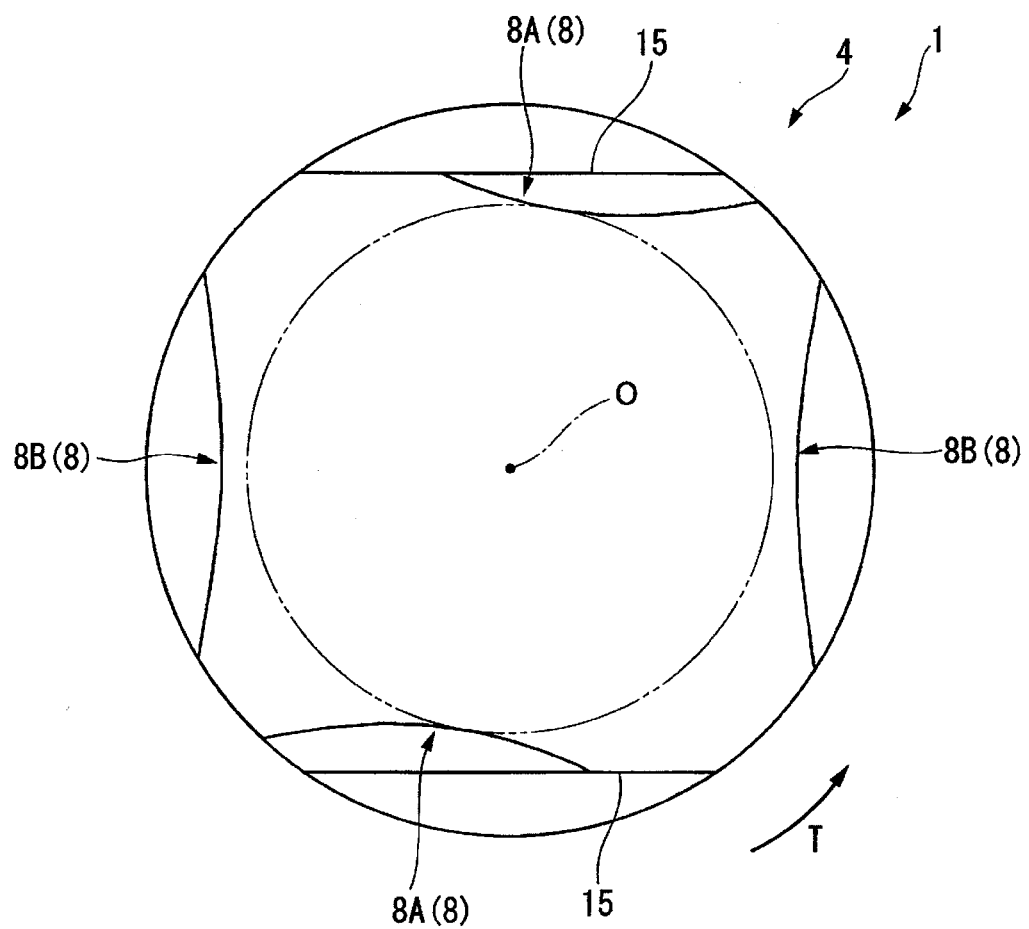
FIG. 8 is a view, corresponding to the cross-section B-B of FIG. 1, illustrating the replaceable cutting head related to the reference example different from the invention in technical thought.
Figure 9:
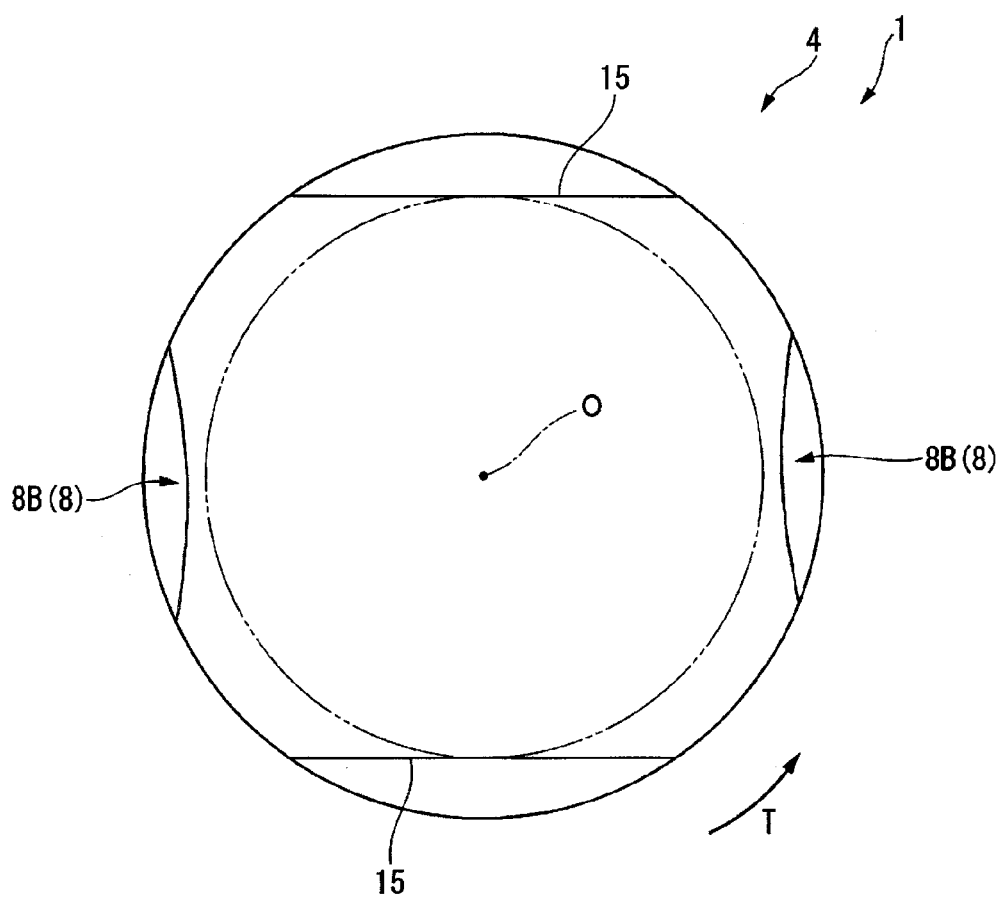
FIG. 9 is a view, corresponding to the cross-section C-C of FIG. 1, illustrating the replaceable cutting head related to the reference example different from the invention in technical thought.

Here, as a reference example different from the invention in technical thought, a configuration in which the pair of latching faces 15 are connected to the base end portions of the first chip discharge grooves 8A is shown in FIGS. 7 to 9.

In this reference example, the distance between the pair of latching faces 15 (distance between outer peripheries in the up-and-down direction in FIG. 9) is smaller in the base end portion of the head body 1 shown in FIG. 9, compared to the distance between the pair of second chip discharge grooves 8B (distance between outer peripheries in the right-and-left direction in FIG. 9). Additionally, the distance between the pair of first chip discharge grooves 8A (distance between outer peripheries in the up-and-down direction in FIG. 8) is smaller even in the portion located further toward the tip side than the base end portion of the head body 1 shown in FIG. 8, compared to the distance between the pair of second chip discharge grooves 8B (distance between outer peripheries in the right-and-left direction in FIG. 8).

In such a configuration, the circumferential portion of the head body 1 where rigidity becomes low becomes continuous in the direction of the axis O, and there is a possibility that chattering vibration or the like may be apt to occur during cutting work.

Additionally, as a second effect related to the embodiment of the invention, chip discharge performance can be enhanced even in the second chip discharge groove 8B where the width of the base end portion is narrow.

That is, since the latching face 15 formed by cutting the outer periphery of the head body 1 is connected to the base end portion (cut-end portion) of the second chip discharge groove 8B, a space is easily secured between the latching face 15 and a worked surface of a work material to be cut by the replaceable cutting head 10. That is, the latching face 15 functions like a chip pocket, and thus, it is possible to avoid a situation where chips that flow within the second chip discharge groove 8B are clogged at the cut-end portion of the groove, and chip discharge performance is improved.

Additionally, as a third effect, it is possible to stably perform the work of detaching and attaching the head body 1 with respect to the tool body while keeping the length of the head body 1 along the direction of the axis O small to reduce manufacturing cost.

That is, since the latching face 15 to which a work tool is latched is arranged at the base end portion of the outer periphery of the head body 1 and is connected to the base end portion of the chip discharge groove 8, it is easy to keep the length of the head body 1 small along the direction of the axis O, compared to a configuration where the latching face 15 and the chip discharge groove 8 are arranged at an interval in the direction of the axis O, unlike the present embodiment (for example, as in JP-A-2010-284752).

Additionally, compared to a tool body for which it is easy to make parts common and is easily manufactured at low cost, the head body 1 of the replaceable cutting head 10 is made of expensive materials, such as cemented carbide, and manufacture of the cutting head is complicated, such as the replaceable cutting blade portion 3 and the latching portion 4 being subjected to coating treatment, and a plurality of types of replaceable cutting heads are prepared by including various cutting blades according to types of tools. Therefore, by preventing the length of the head body 1 along the direction of the axis O as in the present embodiment, the manufacturing cost is reduced and parts management becomes easy.

Additionally, since the chip discharge groove 8 connected to the latching face 15 in the outer periphery of the head body 1 is the second chip discharge groove 8B whose base end portion is made narrow, both end edges (edges) 15a of the latching face 15 along the circumferential direction are kept from being cut out by the second chip discharge groove 8B. That is, according to the present embodiment, it is easy to largely secure the contact (abutment) length along the circumferential direction between the latching face 15 and a work tool latched to the latching face 15. Accordingly, the replaceable cutting head 10 is stably and easily rotated by the work tool, and the workability of attachment and detachment of the replaceable cutting head 10 with respect to the tool body is improved.

As described above, according to the replaceable cutting head 10 of the present embodiment, chattering vibration or the like during cutting work can be suppressed, chip discharge performance can be improved even in the chip discharge groove 8B having a narrow width, and thereby, cutting accuracy and cutting stability can be sufficiently enhanced. In addition, it is possible to stably rotate the head body 1 using a work tool during attachment and detachment with respect to the tool body while making the head body 1 small to suppress the manufacturing cost.

Additionally, in the present embodiment, both end edges 15a of the latching face 15 along the circumferential direction extend in a ridgeline at the outer periphery of the head body 1 without being cut out in the chip discharge groove 8. Thus, the contact (abutment) length along the circumferential direction between the latching face 15 and a work tool latched to the latching face 15 can be reliably and largely secured, and the aforementioned effects, that is, the effects that the replaceable cutting head 10 is stably and easily rotated by the work tool and the workability of attachment and detachment of the replaceable cutting head 10 with respect to the tool body is enhanced becomes more remarkable.

Additionally, in the present embodiment, an even number of the chip discharge grooves 8 are formed at the outer periphery of the head body 1 and the pair of latching faces 15 are respectively connected to base end portions of the second chip discharge grooves 8B that are arranged back to back with the axis O interposed therebetween. Thus, the above-described functions are obtained by both of the pair of latching faces 15, and the effects become more remarkable.

In addition, the invention is not limited to the aforementioned embodiment, and various changes can be made without departing from the scope of the invention.

For example, although the replaceable cutting head 10 is formed in the shape of a radius end mill in the aforementioned embodiment, the invention is not limited to this. That is, the replaceable cutting head of the invention can be used for various kinds of turning cutting, such as end milling, drilling, and reaming, and is not limited to the shape described in the aforementioned embodiment.

Additionally, although the chip discharge groove 8 and the peripheral cutting blade 6 extend so as to be gradually twisted toward the back in the tool rotational direction T as it goes from the tip of the cutting blade portion 3 to the base end side, the invention is not limited to this. That is, the chip discharge groove 8 and the peripheral cutting blade 6 just have to extend along the direction of the axis O, and may extend so as to be gradually twisted forward in the tool rotational direction T as it goes from the tip of the cutting blade portion 3 to the base end side, or may extend parallel to the axis O.

Additionally, although a total of four chip discharge grooves, that is, two first chip discharge grooves 8A and two second chip discharge grooves 8B having mutually different widths in the circumferential direction are formed at at least the base end portions thereof along the direction of the axis O at the outer periphery of the head body 1 so as to be alternate in the circumferential direction, the invention is not limited to this. That is, the number of chip discharge grooves 8 is not limited to the aforementioned even number, such as four, and may be, for example, an odd number, such as three. In this case at least one latching face 15 of the pair of latching faces 15 is connected to the base end portion of the narrow second chip discharge groove 8B, and thereby, the aforementioned functional effects are obtained.

Additionally, three or more types of chip discharge grooves may be provided so as to have different widths in the circumferential direction at at least the base end portions (cut-end portions) thereof along the direction of the axis O. In this case, a chip discharge groove 8 having a largest groove width in a cut-end portion serves as the first chip discharge groove 8A and the other chip discharge grooves 8 serve as the second chip discharge grooves 8B, and the latching face 15 is connected to the base end portion of the second chip discharge groove 8B.

Additionally, in the example of the aforementioned embodiment, as shown in FIGS. 1 and 4, both end edges 15a of the pair of latching faces 15 along the circumferential direction extend in a ridgeline at the outer periphery of the head body 1 without being cut out together in the chip discharge grooves 8. However, the invention is not limited to this. That is, both end edges 15a of at least one latching face 15 along the circumferential direction out of the pair of latching faces 15 just have to extend in a ridgeline at the outer periphery of the head body 1 without being cut out together in the chip discharge grooves 8. As a result, the aforementioned functional effects are obtained.

In addition, the respective components (constituent elements) described in the aforementioned embodiment, modifications, and the like may be combined without departing from the scope of the invention, and additions, omissions, substitutions, and other alternations of components can be made. Additionally, the invention is not limited by the aforementioned embodiment, and is limited only by the appended claims.

DESCRIPTION OF REFERENCE NUMERALS AND SIGNS

1: HEAD BODY
6: PERIPHERAL CUTTING BLADE (CUTTING BLADE)
8: CHIP DISCHARGE GROOVE
8A: FIRST CHIP DISCHARGE GROOVE
8B: SECOND CHIP DISCHARGE GROOVE
10: REPLACEABLE CUTTING HEAD
15: LATCHING FACE
15a: END EDGE OF LATCHING FACE ALONG CIRCUMFERENTIAL DIRECTION
O: AXIS

The invention claimed is:

1. A replaceable cutting head having a head body detachably attached to a tip of a tool body rotating around rotation axis, said head body comprising:
   a cutting blade portion having an axis and a base end;
   an attaching portion to be attached to the tip of the tool body;
   a latching portion formed between the base end of the cutting blade portion and the attaching portion coaxially with the cutting blade portion and the attaching portion;
   a plurality of chip discharge grooves which are formed on an outer periphery of the cutting blade portion so as to extend along the axis and are configured to discharge chips from the head body;
   cutting blades that extend along the chip discharge grooves; and
   a pair of latching faces that are formed by cutting the outer periphery of the latching portion in a planar shape and are arranged back to back with the axis interposed there between,
   wherein the chip discharge grooves include at least one first chip discharge groove and at least one second chip discharge groove,
   the second chip discharge groove has a narrower width along a circumferential direction around the axis than a width of the first chip discharge groove at the base end,
   the first chip discharge groove and the second chip discharge groove are alternately disposed in the circumferential direction, at least one latching face has a width in the circumferential direction that is approximately the same as the width of the second chip discharge groove, and the at least one latching face is directly connected to the second chip discharge groove such that a base end of the second chip discharge groove is aligned with the at least one latching face in an axial direction and clogging of the chips in the second chip discharge groove is prevented, the latching portion has a diameter equal to or smaller than the diameter of the cutting blade portion, and the base end of the second chip discharge groove is located between a pair of end edges of the at least one latching face, said end edges being located at both ends of the at least one latching face in the circumferential direction.

2. The replaceable cutting head according to claim 1, wherein both end edges of the at least one latching face along the circumferential direction extend in a ridgeline at the outer periphery of the latching portion without being cut out by the second chip discharge grooves.

3. The replaceable cutting head according to claim 2, wherein a pair of the second chip discharge grooves are formed at the outer periphery of the cutting blade portion, and the pair of latching faces are respectively connected to the base ends of the second chip discharge grooves.

4. The replaceable cutting head according to claim 1, wherein a pair of the second chip discharge grooves are formed at the outer periphery of the cutting blade portion, and the pair of latching faces are respectively connected to the base ends of the second chip discharge grooves.

5. The replaceable cutting head according to claim 1, wherein a groove width of the first chip discharge groove along the circumferential direction is equal to a groove width of the second discharge groove at a tip end portion of the cutting blade portion.

6. The replaceable cutting head according to claim 1, wherein each of the first chip discharge groove and the second chip discharge groove comprises:
a main groove that forms a peripheral cutting blade and a rake face, and
a sub-groove that is adjacent to a front of the main groove in a tool rotation direction, wherein the main groove and the sub-groove form a ridgeline therebetween, and the ridgeline has a convex V-shape cross-section which protrudes toward an outer side in the radial direction and extends so as to be twisted along each of chip discharge grooves.

7. The replaceable cutting head according to claim 1, wherein a number of the first chip discharge grooves is two, and a number of the second chip discharge grooves is two.

8. The replaceable cutting head according to claim 1, wherein a total number of the first chip discharge grooves and the second chip discharge grooves is three.

9. The replaceable cutting head according to claim 1, wherein one end of the latching face connected to the second chip discharge groove is cut-out by a curved end of the second chip discharge groove such that the one end of the latching face has a concave curved shape toward an inside of the latching face.

10. The replaceable cutting head according to claim 1, wherein at least one of the latching faces has a width in the circumferential direction that is the same as the width of the second chip discharge groove.

11. The replaceable cutting head according to claim 1, wherein the pair of end edges extend parallel to the rotation axial and are connected to the cutting blades.

12. The replaceable cutting head according to claim 1, wherein an outermost diameter of the latching portion is equal to or smaller than an outermost diameter of the cutting blade portion.

13. A replaceable cutting head having a head body for detachable connection to a tip of a tool body rotatable around a rotation axis, said head body comprising:
a cutting blade portion having an axis and a base end;
an attaching portion for attachment to the tip of the tool body;
a latching portion formed between the base end of the cutting blade portion and the attaching portion, said latching portion being coaxially aligned with the cutting blade portion and the attaching portion;
a plurality of pairs of chip discharge grooves which are formed on an outer periphery of the cutting blade portion so as to extend along the axis, said grooves being configured to discharge chips from the head body;
cutting blades that extend along the chip discharge grooves; and
a pair of latching faces that are formed by cutting the outer periphery of the latching portion in a planar shape, said latching faces being arranged back to back with the axis interposed there between, wherein the pairs of chip discharge grooves include at least a first chip discharge groove and a second chip discharge groove, in each pair the second chip discharge groove having a narrower width at the base end along a circumferential direction around the axis than a width of the first chip discharge groove at the base end, the pairs of chip discharge grooves being arranged such that first chip discharge groove and second chip discharge groove are alternately disposed in the circumferential direction, at least one latching face has a width in the circumferential direction that is the same as a maximum width of the second chip discharge groove, and the at least one latching face is directly connected at the maximum width of the second chip discharge groove such that an end of the second chip discharge groove at the base end of the cutting blade portion is aligned with the at least one latching face in the axial direction and clogging of the chips in the second chip discharge groove is prevented, the latching portion has a diameter equal to or smaller than the diameter of the cutting blade portion, and the base end of the second chip discharge groove is located between a pair of sides of the at least one latching face, the pair of sides being located at both ends of the at least one latching face in the circumferential direction.

* * * * *